Feb. 4, 1958 D. H. McCORKLE, SR 2,821,837
TWO-WAY FAST ACTING BIMETAL CONTROL ELEMENT AND
IMPROVEMENTS THEREIN
Filed April 6, 1954 2 Sheets-Sheet 1

INVENTOR.
DONALD H. McCORKLE, SR.
BY Naylor and Lasagna
ATTORNEYS

Feb. 4, 1958 D. H. McCORKLE, SR 2,821,837
TWO-WAY FAST ACTING BIMETAL CONTROL ELEMENT AND
IMPROVEMENTS THEREIN
Filed April 6, 1954 2 Sheets-Sheet 2

INVENTOR.
DONALD H. McCORKLE, SR.
BY Naylor and Lasargne
ATTORNEYS

United States Patent Office 2,821,837
Patented Feb. 4, 1958

2,821,837

TWO-WAY FAST ACTING BIMETAL CONTROL ELEMENT AND IMPROVEMENTS THEREIN

Donald H. McCorkle, Sr., Berkeley, Calif., assignor to D. H. McCorkle Company, Berkeley, Calif., a corporation of California Application April 6, 1954, Serial No. 421,365

8 Claims. (Cl. 60—23)

This invention relates to heat motors, and more particularly to two-way fast acting bimetal control element systems and improvements therein.

The inventions forming the subject matter of this application may be considered as constituting, invention-wise, progressive developments in heat motors of the two-way fast acting type shown in my copending applications, Serial Number 348,275, filed April 13, 1953, now Patent No. 2,743,574, issued May 1, 1956, and Serial Number 393,254, filed November 20, 1953. The bimetal heat motors of said co-pending applications comprise a pair of bimetal strips physically joined together in end to end relation, with one of the strips being inverted with respect to the other, i. e. with the fast expanding metal being disposed at the upper side of one strip and at the lower side of the other. The present invention has for its primary purpose and object the provision of a two-way fast acting heat motor comprising a pair of bimetal strips which are not physically joined together. A further object is the provision of a two-way fast acting compound bimetal strip heat motor in which the bimetal strips have their slow expansion and fast expansion sides commonly oriented.

These and other objects and advantages of the invention will be apparent from the following description taken in conjunction with the drawings forming part of this specification, and in which.

Figure 8:
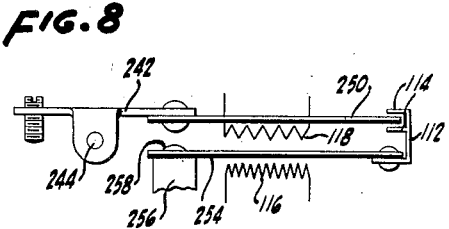
Figure 8 is a semi-schematic view in side elevation of another modified form of the heat motor of the invention.
Figure 9:
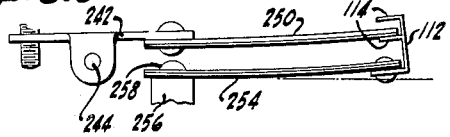
Figure 10:
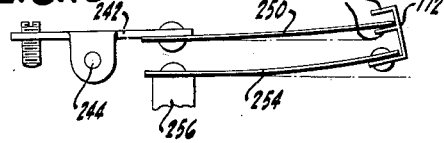
Figure 11:
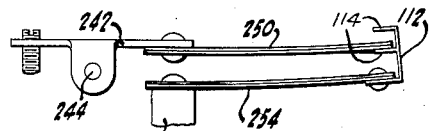
Figure 12:
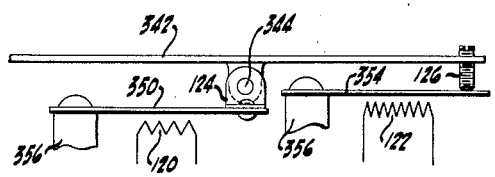
Figure 13:
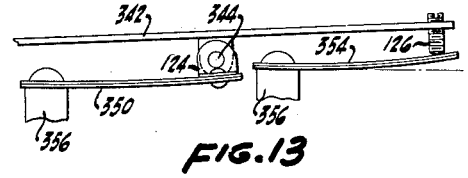
Figure 14:
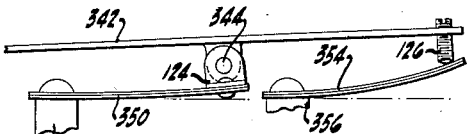
Figure 15:
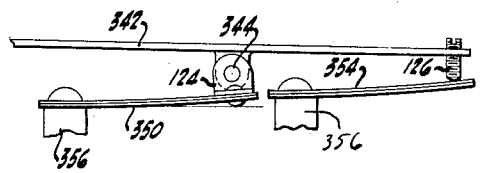

Figures 9–11, both inclusive, are semi-schematic views of the heat motor of Figure 8, showing sequential operating positions thereof;

Figure 12 is a semi-schematic view in side elevation of still a further modification of the heat motor of the invention; and Figures 13–15, both inclusive, are sequential operating position views of the heat motor of Figure 12.

Figure 1:
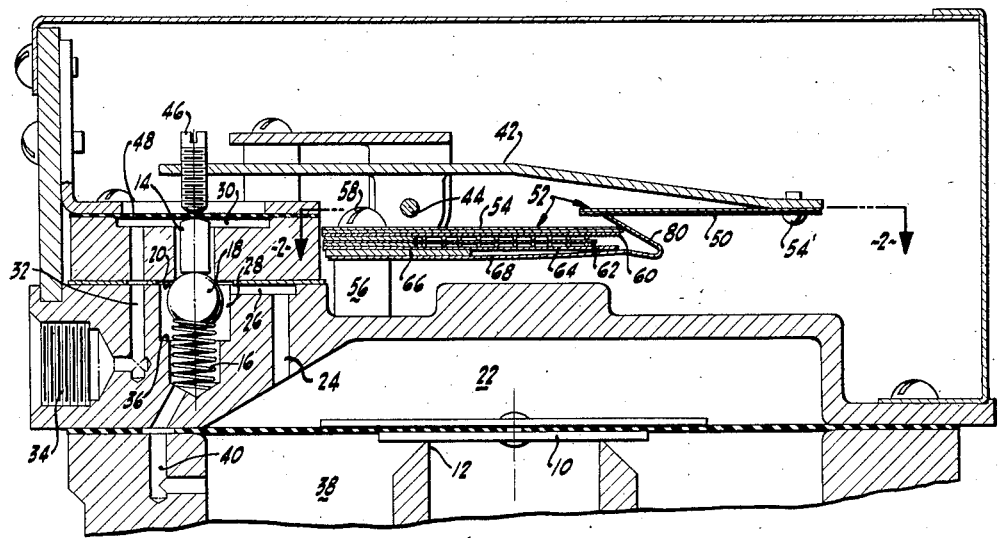
Figure 1 is a view in vertical section of a gas furnace control valve of the diaphragm puff bleed type, with one form of the heat motor of the invention being shown in control relation therewith.
Figure 2:
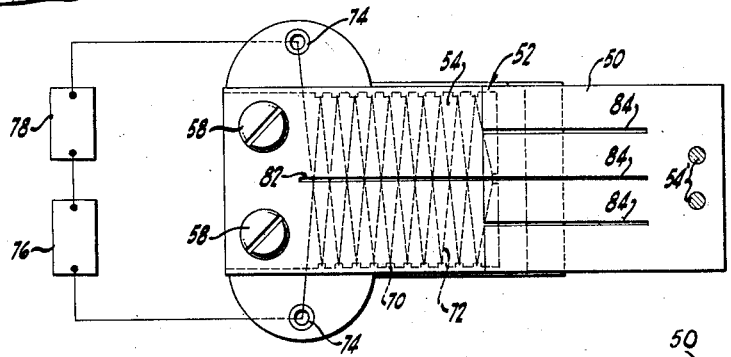
Figure 2 is a detail view of the heat motor of Figure 1, as taken along lines 2—2 of Figure 1.

The gas valve of Figure 1 is conventional in form, and forms no part of the subject invention, being shown merely by way of example of an environmental structure with which the heat motor of the invention may be used. In passing, when the diaphragm valve element 10 is raised from seat 12, gas may pass from a primary inlet, not shown, to a primary outlet, not shown. Diaphragm valve element 10 is raised when the pressures above and below the diaphragm are unbalanced, with this unbalancing taking place when valve stem 14 is moved downwardly against the action of spring 16 to unseat ball 18 from seat 20, thereby bleeding the upper diaphragm chamber 22 through passage 24, passage 26, valve chamber 28, valve chamber 30, and passage 32 to bleeder outlet 34, and to bring ball 18 into engagement with seat 36, thereby interrupting communication between lower diaphragm chamber 38 and the upper chamber 22, which communication had theretofore existed through passage 40, chamber 28, and passages 26 and 24.

The stem 14 is moved downwardly when lever 42 is rocked in a counter clockwise direction about its pivotal axis 44 to cause adjustment screw 46 carried thereby to move sealing diaphragm 48 downwardly, thereby effecting downward movement of stem 14. A two-way connection between lever 42 and the secondary bimetal strip 50 portion of the heat motor indicated generally at 52 is provided, for example, by bolts 54'.

The heat motor 52 comprises primary and secondary bimetal strips 54 and 50 having their metal portions of highest heat sensitivity disposed at their undersides. Strip 54 has an end thereof fixedly secured to support member 56 by bolts 58 which also serve to secure mica strips 60, 62 and 64, laminated mica takeoff head 66, and copper strip 68 to the support member 56. Mica strip 62 is provided with edge notches 70 and serves as the carrier for a continuous resistance winding 72, the ends of which extend through hollow rivets 74 carried by takeoff head 66 and are connected into a circuit which comprises a transformer 76 and a thermostat control 78. Winding 72 and its mica carrier strip 62 are sandwiched between mica strips 60 and 64. Copper strip 68 has its free end 80 turned back and disposed in engagement with the end of strip 54 and the underside of strip 50. When strip 54 is moved upwardly relative to strip 50, the free end 80 of the relatively thin and readily deformable copper strip 68 is pressed into parallelism with the overlapping end of the two bimetal strips.

Strip 54 is provided with a longitudinally extending slit 82 and strip 50 is provided with a plurality of slits 84, which slits are adapted to minimize transverse warping or curling of the strips 50 and 54. Such warping or curling would materially reduce the rate of upward and downward warping of the two strips.

Figure 3:
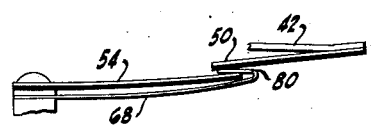
Figures 3, 4, 5 and 6 are semi-schematic views in side elevation of the heat motor in Figures 1 and 2, showing sequential operation positions of the same.
Figure 4:
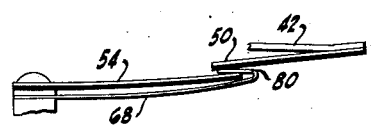
Figure 5:
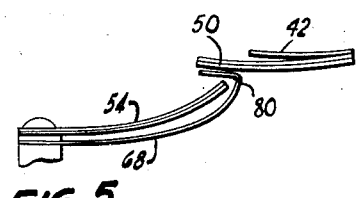

When the electrical circuit which includes winding 72 is energized under the control of thermostat element 78, the heating of winding 72 causes strip 54 to rapidly rise in temperature and to consequently warp upwardly from its position of Figure 3 to that of Figure 4. This movement is transmitted through the as yet unwarped strip 50 to lever 42 to cause a counter clockwise pivoting of the latter, with respect to Figure 1, to move ball 18 out of engagement with seat 20 and into engagement with seat 36. Strip 50, which is provided with no heating element of its own, is thereafter caused to warp upwardly, as shown in Figure 5, but it does so to a lesser degree and at a slower rate than does strip 54 due to the fact that it depends for its temperature increase on the heat conduction and radiation effect imparted to it by the positively heated strip 54. Thus, the free end of strip 54 exerts a positive and upwardly directed pressure on the free end of strip 50 for the entire period during which winding 72 is being heated. Spring 16 urges the free end of strip 50 into downward pressing engagement with the free end of strip 54.

Figure 6:
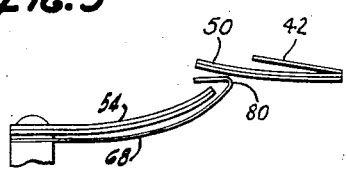

Upon de-energization of the heating circuit for strip 54, strip 54, which is at a higher temperature than strip 50, cools at a faster rate than strip 50, with the result that the differential in the rate of downward movement due to cooling of the free ends of the two strips allows the spring 16 to quickly move ball 18 out of engagement with seat 36 and into engagement with seat 20. Figure 6 illustrates the positional relationship of the two strips shortly after de-energization of the heating circuit for strip 54. Since strip 54 has a higher temperature than strip 50 in the Figure 5 condition, the temperature drop of strip 54 between the Figure 5 and Figure 6 conditions is greater than that for strip 50. Thus, strip 54 has flexed downwardly to a greater degree than strip 50 to permit lever 42 to be moved upwardly by spring 16.

It will be appreciated that if strip 50 were non-bimetallic in nature, strip 54, upon the closing of its heating circuit, would be fast-acting with respect to lever 42 on the heating side of the cycle of movement of strip 54, but such a two strip system would not be fast-acting on the cooling side of the cycle of movement of strip 54 due to the fact that a non-bimetallic secondary strip, whether flexible or inflexible, would move downwardly in immediately following relation to strip 54, and thus a greater amplitude of downward movement of strip 54 would be required, than that required in the heat motor system of Figures 1-6, to effect a valve actuating movement of lever 42. With strip 50 bimetallic in nature, as described, the heat motor is fast-acting in the downward direction due to the fact that the "lost motion" put into the compound bimetal strip system during the heating cycle, i. e. the degree of conjoint upward movement of the over-lapping ends of strips 50 and 54 in excess of that required to effect a valve actuating movement of lever 42, is not taken out of the heat motor system at the beginning of the cooling cycle, but is taken out at the end of the cooling cycle where it has no delaying effect on the reverse valve actuating movement of lever 42. This "last in—last out lost motion" effect is due to the unbalanced rates of heating and cooling of the two strips. It will be appreciated that this effect may be either increased or decreased by varying the lengths of the two strips.

The heat motor system described is faster acting in both directions of control movement when the copper strip 68 is employed. It is believed that this may be due to the strip 68 acting as a heat transfer bridge between the ends of strip 54. The inner, or anchored, end of strip 54 tends to be both heated and cooled more rapidly than the outer, or free, end of the strip. It is believed that the copper strip serves to deliver heat from the anchored end of strip 54 to the free end thereof during the heating cycle and to conduct heat away from the free end of the strip 54 during the cooling cycle.

Figure 7:
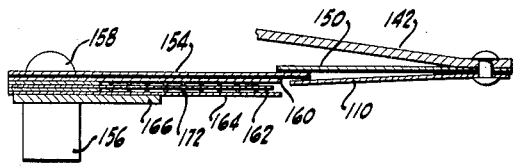
Figure 7 is a view in vertical section of a modified form of the heat motor of the invention.

A modified form of the heat motor of the invention is shown in Figure 7, wherein parts corresponding to those of the heat mootr system of Figure 1-6 are designated by the same reference numerals plus 100. The arrangement of Figure 7 differs from that of Figures 1-6 in that the strip 68 of the latter embodiment of the invention is not present and a leaf spring 110 of, for example, copper-beryllium alloy is attached to the lever 142 in adjacently disposed relation to bimetal strip 150. The end of bimetal strip 154 extends between the ends of strip 150 and leaf spring 110, but strip 154 is not attached to strip 150 or to leaf spring 110. Leaf spring 110 tends to maintain a positive contact pressure between the ends of strips 150 and 154, thus promoting a rapid conducting of heat from strip 154 to strip 150. Such heat transfer takes place both by way of direct contact between the two bimetal strips and by way of indirect transfer to strip 150 through leaf spring 110. The lessening of the time period required for strip 150 to reach a stabilized temperature, in comparison with that required for strip 50, does not appreciably effect the fast acting characteristics of the heat motor on the heating side of the cycle. However, leaf spring 110 provides for even quicker valve control action of the heat motor on the cooling side of the cycle for the following reasons: the cooling of strip 150 is retarded due to the reduction by leaf spring 110 of heat radiation from the underside of strip 150; and heat from strip 154, which is at a higher temperature than strip 150 both during the heat and cooling portions of the operating cycle, will be transferred to strip 150 during the cooling portion both directly and indirectly, i. e. through leaf spring 110. Thus, during the cooling portion of the cycle leaf spring 110 is effective to accelerate the downward flexing of strip 154 and retard the downward flexing of strip 150. This makes for faster action of the heat motor on the down stroke.

A further modification of the heat motor of the invention is shown in Figures 8–11. In this embodiment of the invention, bimetal strip 254 has one end thereof fixedly attached to support 256, as by bolt 258, and has secured to its other end a bracket 112. Lever 242 having its fulcrum at 244 has secured to one end thereof bimetal strip 250, the free end of which extends between closely spaced ear portions 114 of bracket 112. Resistance windings 116 and 118 are provided for strips 254 and 250, with winding 116 being adapted to heat strip 254 at a faster rate and to a higher temperature than the rate and degree of heating of strip 250 by winding 118.

Figure 8 shows the heat motor at ambient temperature.

Figure 9 shows it as it appears immediately after lever 242 has been actuated in one direction. Such actuation takes place within a relative few seconds after windings 116 and 118 have been energized. Since winding 116 heats blade 254 more rapidly than winding 118 heats blade 250, blade 254 is flexed more than blade 250 in Figure 9.

Figure 11 shows the relative position of the blades immediately after lever 242 has been actuated in the reverse direction. Such reverse actuation takes place within a relatively few seconds after windings 116 and 118 have been de-energized. While blade 254 has cooled, or unflexed, to a greater degree than blade 250, it is still flexed to a greater degree than blade 250. However, the unflexing movement of 254 relative to that of 250, has brought the upper ear 114 into engagement with 250 and has pulled 250 downwardly to reversely actuate lever 242. In practice, the distance between the ears 114 is only great enough to prevent the end of blade 250 from binding therebetween when it flexes.

A further modification of the heat motor of the invention is shown in Figures 12-15. Bimetal strips 350 and 354, having associated therewith, respectively, lesser and greater rated heating elements 120 and 122, have their ends fixedly attached to support members 356. Lever 342 is pivotally attached at 344 to fulcrum support means 124 fixedly connected to the free end of strip 350. An adjustment screw 126 carried by lever 342 is disposed above the free end of strip 354.

Figure 12 shows the heat motor at ambient temperature.

Figure 13 shows it as it appears immediately after lever 342 has been actuated in one direction. Since blade 354 is hotter than blade 350, it is flexed to a greater degree.

Figure 14 shows the normal "on" cycle position of the two blades, with blade 354 being flexed more than blade 350 since it is at a higher temperature.

Figure 15 shows the relative position of the blades immediately after lever 342 has been reversely actuated, the same having been permitted by downward movement of blade 354 and having been caused by the action of a spring, such as 16 in Figure 1.

While blade 354 has cooled, or un-flexed, to a greater degree than blade 350, it is still flexed to a greater degree than blade 350. The relative un-flexing movement between the two blades has allowed lever 342 to be reversely actuated.

What is claimed is:

1. A heat motor comprising a first bimetal strip, means anchoring one end of said strip, a second bimetal strip normally disposed substantially in parallelism with said first strip and adapted to warp in the same direction as said first strip under the influence of a rise in temperature, a pivotally mounted lever, an attaching connection between said lever and one end of said second strip whereby said lever serves as a mounting means and carrier for said second strip, heating means for said strips adapted to heat said first strip at a faster rate than said second strip, the other ends of said strip being cooperatively positioned one above the other whereby warping movement of said first strip is transmitted to said lever through said second strip.

2. A heat motor comprising first and second bimetal strips, fixed carrier means for said first strip connected to one end thereof, pivotally movable mounting and carrier means for said second strip attachably connected to one end thereof, said strips being disposed to warp in the same direction under the influence of a rise in temperature and having their other ends cooperatively positioned one above the other whereby said mounting and carrier means for said second strip will be pivotally moved during the warping of said strips, and heating means for said strips adapted to heat said first strip at a faster rate than said second strip.

3. A heat motor comprising a first bimetal strip, means positionally anchoring one end thereof, a second bimetal strip having one end thereof disposed in overlapping relation with the other end of said first strip, movable means to be controlled by said strips serving as the mounting means and carrier for said second strip, said strips being disposed so that they warp in the same direction under the influence of heat, resistance heating means associated with said first strip, and means for conducting heat from said first strip to said second strip.

4. A heat motor comprising a first bimetal strip, means positionally anchoring one end thereof, a second bimetal strip normally disposed substantially in parallelism with said first strip and having one end thereof disposed in overlying relation with the other end of said first strip, yieldingly movable means to be controlled by said strips serving as the carrier for said second strip, said strips being so disposed as to warp in the same direction under the influence of heat, resistance heating means disposed at the underside of said first strip in juxtaposed relation thereto, means for electrically insulating said heating means from said first strip, and a metal strip having good heat conducting properties extending along the underside of said first strip and having a reversely bent end extending between and mutually contacting said one end of said second strip and said other end of said first strip.

5. A heat motor comprising a first bimetal strip, means positionally anchoring one end thereof, a second bimetal strip normally disposed substantially in parallelism with said first strip and having one end thereof disposed in overlying relation with the other end of said first strip, yieldingly movable means to be controlled by said strips serving as the carrier for said second strip, said strips being so disposed as to warp in the same direction under the influence of heat, resistance heating means disposed at the underside of said first strip in juxtaposed relation thereto, means for electrically insulating said heating means from said first strip, and a leaf spring strip of metal having good heat conductor properties carried by said yieldingly movable means and extending in adjacently disposed parallel relation to said second strip, with said other end of said first strip extending between said leaf spring strip and said one end of said second strip, said leaf spring strip tending to press said ends of the bimetal strips together.

6. A heat motor comprising a first bimetal strip having a fixed end and a free end, a second bimetal strip normally disposed substantially in parallelism with said first strip and having one end thereof disposed in overlying spaced relation with the free end of said first strip, movable means to be controlled by said strips having a connection with the other end of said second strip and serving as the carrier for said second strip, said strips being disposed to warp in the same direction under the influence of heat, heating means for said strips adapted to heat said first strip at a faster rate than said second strip, and means forming a two way connection between said one end of said second strip and the free end of said first strip.

7. A heat motor comprising a first bimetal strip, means positionally anchoring one end of said strip, a second bimetal strip normally disposed substantially in parallelism with said first strip and adapted to warp in the same direction as said first strip under the influence of heat, yieldingly movable means to be controlled by the conjoint warping movement of said strips having a connection with one end of said second strip and serving as the mounting means and carrier for said second strip, said second strip having its other and free end disposed in overlying adjacently disposed relation with the other and free end of said first strip, and means for heating said strips adapted to heat said first strip at a faster rate than said second strip.

8. A heat motor comprising first and second bimetal strips, means for heating said strips adapted to heat said first strip at a faster rate than said second strip, fixed carrier means for said first strip connected to one end thereof, a pivotally mounted lever, said second strip having one end thereof attached to said lever, said strips being disposed to warp in the same direction under the influence of a rise in temperature, with said second strip being located above said first strip and with the other ends of said strips being positioned in overlying relation, whereby upward warping of said first strip imparts movement to said second strip which in turn imparts a pivotal movement to said lever, said lever having spring means associated therewith urging said lever to move said second strip toward said first strip.

References Cited in the file of this patent

UNITED STATES PATENTS

| | | |
|---|---|---|
| 2,643,061 | Johnson | June 23, 1953 |
| 2,687,007 | Reitz | Aug. 24, 1954 |